United States Patent Office 3,761,367
Patented Sept. 25, 1973

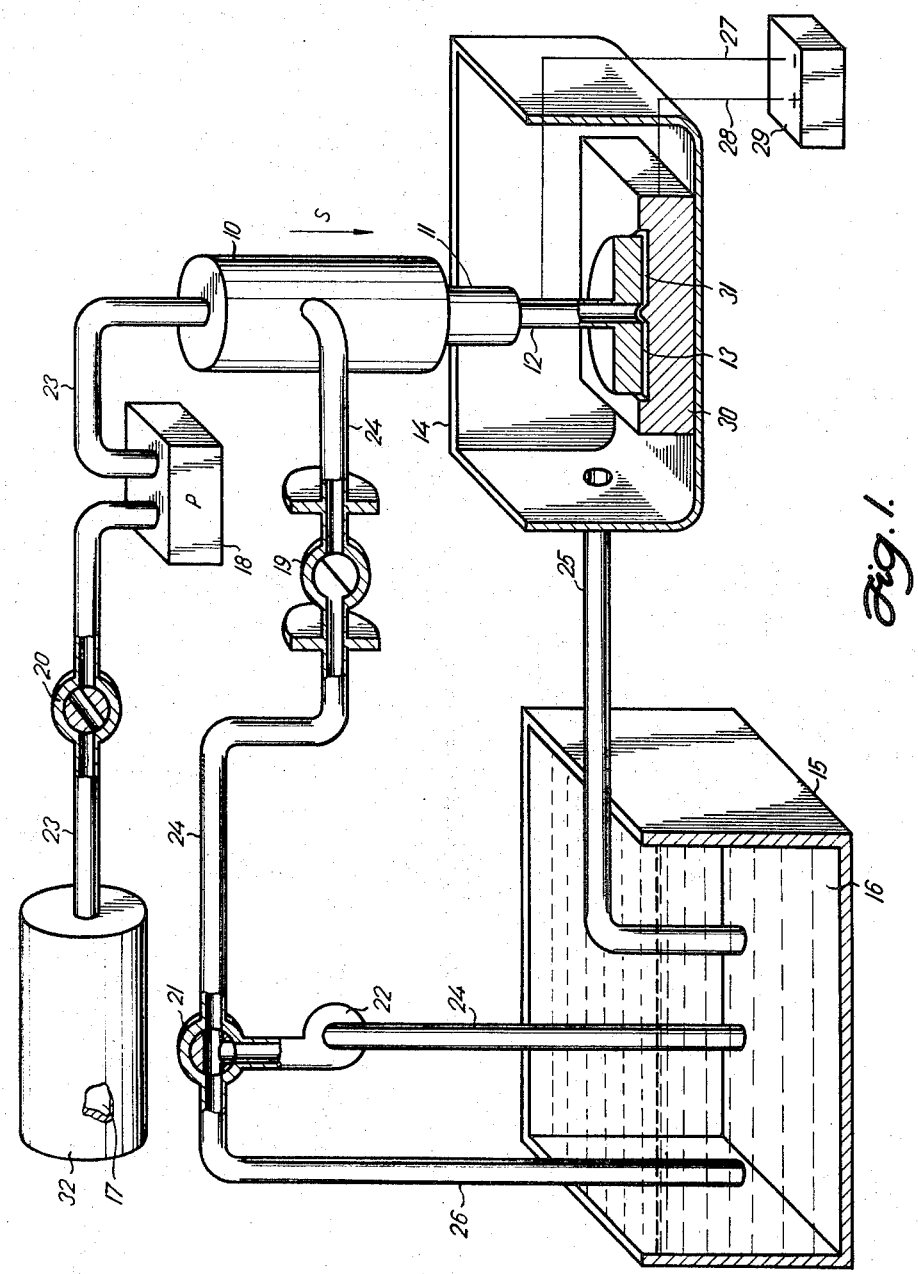

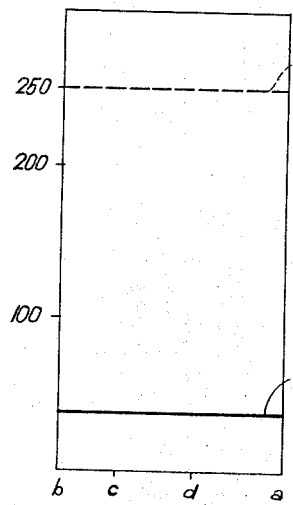
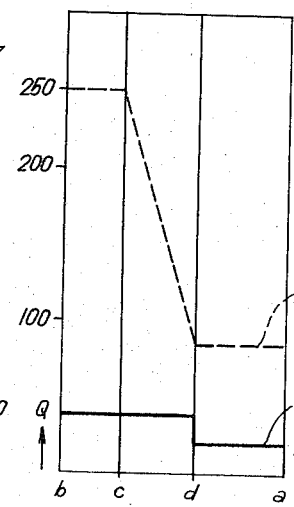
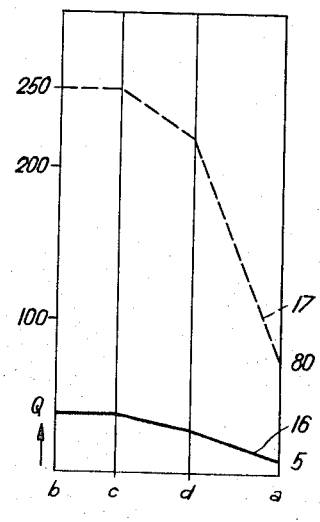
Fig. 6.   Fig. 7.   Fig. 8.
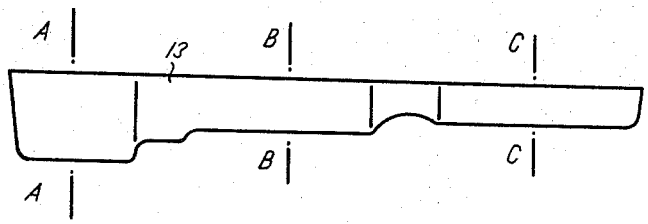
Fig. 2.
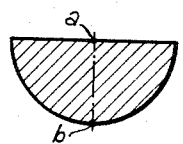      
Fig. 3.   Fig. 4.   Fig. 5.

3,761,367
METHOD OF ELECTROCHEMICAL WORKING OF ELECTRICALLY CONDUCTIVE MATERIAL
Jan Zubak, Ostrov, Ctibor Trebichavsky, Nove Mesto nad Vahom, and Jan Augustin, Podolie, Czechoslovakia, assignors to Vyskumny ustav mechanizacie a automatizacie, Nove Mesto nad Vahom, Czechoslovakia
Filed Oct. 29, 1971, Ser. No. 193,849
Int. Cl. B23p 1/00
U.S. Cl. 204—129.5          5 Claims

ABSTRACT OF THE DISCLOSURE

In electrochemical working of electrically conductive material, the amount of the liquid working medium conducting electric current passing through the interelectrode gap is varied together with variations of the magnitude of this gap so that prior to finished working a minimum interelectrode gap in direction of mutual advance of tool and workpiece is achieved.

BACKGROUND OF THE INVENTION

This invention relates to a method of electrochemical working of electrically conductive material, where the amount of working liquid which conducts electrolytically the electric current is varied in the interelectrode space.

A narrow interelectrode space, rinsed by the working liquid is for known methods of electrochemical working maintained between the active surface of an electrically negatively charged working tool and between the worked surface of the electrically positively charged workpiece by a relative change of their mutual position, the working liquid being either the liquid electrolyte itself, capable of electrolytically conducting the electric current and of anodic dissolution of the worked surface of the workpice or is this electrolyte mixed with an electrically not conductive material of gaseous, solid or liquid consistence. The magnitude of the interelectrode space in direction of the mutual advance of the working tool and the workpiece influences the magnitude of the interelectrode gap at places inclined with respect to the direction of the mutual advance of tool and workpiece, whereby the magnitude of this gap is for these inclined surfaces larger than for those perpendicular to the direction of advance. The inequality of this interelectrode gap is the reason, why for a differently shaped active surface of the working tool, its active surface has to be adjusted with respect to the required shape of the cavity or surface of the workpiece, worked by electrochemical working. Such an adjustment of the working tool, called correction, becomes for this kind of working a necessity, which substantially increases manufacturing costs. This correction is particularly disadvantageous if the smallest interelectrode gap is about 0.2 to 0.5 mm., as the remaining interelectrode gaps may be as large as 2.0 mm. and more Corrections of the working tool are accomplished by removing from the differently shaped active surface of the working tool a layer of variable thickness corresponding to the respective magnitudes of the interelectrode gap. Corrections are more favourable if the interelectrode gap is smaller and for minimum interelectrode gaps around 0.05 mm., if the electrolyte is mixed with an electrolytically not conductive material, where the maximum interelectrode gap is about 0.15 mm., it is frequently sufficient to remove for correction of the working tool a uniform layer on its active surface. It is however difficult for small interelectrode gaps to secure an effective rinsing of the interelectrode space and if the electrolyte does not dissolve all reaction products but only washes them out as solid colloidal particles, dissipated in the electrolyte, the active surface of the working toool is frequently damaged by sparking or by short circuits.

These two contradictory requirements of electrochemical working cause that a compromise has to be found between the magnitude of the interelectrode gap and its efficient rinsing. If the sole electrolyte is used for rinsing for electrochemical working, the voltage between tool and workpiece is changed for a simultaneous reduction of the interelectrode gap and as an efficient rinsing cannot be secured for small gaps, the speed of advance between tool and workpiece has to be reduced. The magnitude of the interelectrode gap cannot be however reduced more than for one third. Where for electrochemical working a working medium composed of more than one phase is used, smaller interelectrode gaps are applied without changes of technological parameters.

SUMMARY OF THE INVENTION

It is an object of this invention to reduce these drawbacks of existing methods of electrochemical working and to provide a method, where required adjustments of the working surfaces of the tool would be reduced to a minimum while obtaining the desired shape of the workpiece.

According to this invention where between the shaped active surface of an electrically negatively charged working tool and the worked surface of an electrically positively charged workpiece a small interelectrode gap is maintained by changing the mutual position of working tool and workpiece, which interelectrode gap is rinsed by a multiphase working medium, at least one component of which is capable to electrolytically conduct electric current, which causes anodic dissolution of the material at a rate, corresponding roughly to the speed of advance between working tool and workpiece, the amount of the component of the working medium conducting electrolytically the electric current is varied, changing with changes of flow of the working medium simultaneously also the magnitude of the interelectrode gap so that prior to finished working a minimum interelectrode gap in direction of the relative advance between working tool and workpiece is achieved. The amount of the component of the working medium conducting electrolytically electric current may be varied either continuously or stepwise.

An advantage of the method of electrochemical working according to this invention is, that it enables to reduce the magnitude of the interelectrode gap without changing the speed of mutual advance of tool and workpiece. As the electrochemical working is finished at a minimum interelectrode gap, the size of which would lead for prolonged conditions to some damage of the active part of the working tool by sparking or short circuit, it is sufficient to correct the active part of the working tool by taking off a uniform layer thereof. In the course of reduction of the interelectrode gap, its sufficient rinsing is secured by variations of the composition of the working medium, reducing thereby the hydraulic resistance of the interelectrode space. The electrochemical working according to this invention enables therefore to copy more accurately the shape of the active part of the working tool without reduction of the speed of its advance with respect to the workpiece. In consequence thereof this method of electrochemical working may be applied even for making a single cavity, what has been due to required complicated corrections of the working tool out of question for economical reasons. Another advantage is, that it is possible to manufacture by this method of electrochemical working also fine profiles for instance of the size of 0.2 mm., which could not be accomplished by actually used methods of electrochemical working. This result is achieved by the small final interelectrode gap, which could not be obtained with known methods.

DESCRIPTION OF DRAWINGS

The method of electrochemical working of electrically conductive material according to this invention is described in the following by way of example, using an embodiment indicated in the accompanying drawings, where FIG. 1 is an overall schematic outline of the used arrangement, FIG. 2 a view of the active part of the working tool used thereby, FIG. 3 the cross section of the active part of the tool along the plane A—A indicated in FIG. 2, whereby channels for the passage of the working medium have been omitted, FIG. 4 a similar cross section along the plane B—B indicated in FIG. 2, FIG. 5 a cross section along the plane C—C indicated in FIG. 2, whereby the points $a, b, c, d$ in FIGS. 3 to 5 indicate the respective heights of the tool in the corresponding cross sections, FIG. 6 is a working diagram without variations of the flow of the working medium, FIG. 7 a working diagram with step like variations of flow of the working medium, whereby according to the position of points $b, c, d, a$ which correspond to those indicated in FIGS. 3 to 5, the amount of flowing gas and electrolyte can be determined according to the penetration of the tool into the workpiece, FIG. 8 is a working diagram with continuous variations of flow of the working medium, whereby points $b, c, d, a$ have the same significance as in FIG. 7.

DESCRIPTION OF PREFERRED APPLICATION

With reference to FIG. 1 a workpiece 30 is placed in a working tank 14. The working tool 13, the active surface of which has to be copied into the workpiece is situated above the workpiece 30. The working tool 13 is fixed by means of a tube 12 to a holder 11, which is firmly connected with a mobile mixing chamber 10. The mixing chamber 10 serves for adjustment of the ratio of the liquid phase capable of ionic conductivity of electric current to the not conductive components, in this case of the electrolyte 16 to the gas 17. Gas 17 is supplied from a storage tank 32 into the mixing chamber 10 by way of a conduit 23, whereby the amount of supplied gas 17 is adjusted by a throttling valve 20 and is measured by a flowmeter 18 which measures the amount of gas 17 passing within one minute, the amount of passed gas being indicated at a pressure of one atmosphere and at 18° C. and not at pressures and heat conditions prevailing in the conduit 23.

The electrolyte 16 is supplied from a storage tank 15 by means of a pump 22 over a supply conduit 24 into the mixing chamber 10. The electrolyte 16 is thereby passing over a three-way regulating valve 21 and over a flowmeter 19 indicating passage of the electrolyte 16 in one minute. The three-way regulating valve 21 enables a part of the electrolyte 16 to return over a branch conduit 26 back into the storage tank 15 without passing to the mixing chamber 10, adjusting thus the flow of the electrolyte 16 without interfering into the operation of the pump 22. The used electrolyte 16 returns by way of the conduit 25 from the working tank 14 into the storage tank 15. The workpiece 30 is connected by means of a conductor 28 to the positive pole and the tube 12 of the working tool 13 by means of the conductor 27 to the negative pole of a source 29 of DC current.

In the course of electrochemical working with the described arrangement the mixing chamber 10 together with the working tool 13 and its active surfaces is advanced in direction of the arrow S whereby an interelectrode gap 31 is maintained between the external active surface of the working tool 13 and the opposite surface of the workpiece 30. The magnitude of the interelectrode gap 31 depends for a uniform advance of the working tool 13 in direction S, for a constant electric voltage between the terminals of the source 29 of DC current and for a certain material of the workpiece 30 solely on the amount of electric current, passing between the workpiece 30 and the active surface of the working tool 13. This amount of electric current is then solely influenced by the properties of the working medium, rinsing the interelectrode gap 31. As within a certain time interval, for instance within one minute, a mixture of gas 17 and of the electrolyte 16 passes through the interelectrode gap 31, the amount of electric current passing within this time interval depends on the flow rate of the gas phase measured by the flow meter 18 and on the electrically conductive liquid phase, caring for the anodic dissolution of the material of the workpiece 30, measured by the flowmeter 19. From the point of view of a longer time interval there is no difference if the interelectrode gap 31 is rinsed by quickly alternating streams of gas 17 and of electrolyte 16. There is equally nothing wrong if the interelectrode gap 31 is rinsed by an unstable or by a stable mixture of liquid and not liquid phase.

The same result can be obtained if the workpiece 30 moves with respect to the working tool 13 or if both the workpiece 30 and working tool are advancing simultaneously.

For the method of electrochemical working according to this invention the smallest interelectrode gap 31 is of major importance, which is established in the course of working process in direction of relative advance of working tool 13 and workpiece 30 at a uniform and continuous speed of variation of the position of tool 13 and workpiece 30 at a constant voltage between the active surface of the working tool 13 and the workpiece 30. If we use in the course of working as electrolyte 16 a 30 percent solution of natrium nitrate ($NaNO_3$), the workpiece 30 is of hardened tool steel and as gas 17 carbon dioxide is used ($CO_2$), then the smallest interelectrode gap 31 depends on the flow values measured on the flowmeters 18 and 19. If we maintain in the course of the whole working process on the flowmeter 18 a flow of gas of 250 liters per minute and on the flowmeter 19 a flow of 40 liters per minute, then shortly after starting the working process a minimum interelectrode gap 31 of 0.18 mm. is adjusted, which is maintained up to the end of working (see FIG. 6). Working at an interelectrode gap of 0.18 mm. is less pretentious to protection of the active part of the working tool 13 against damage by short circuits or by discharges.

The method of electrochemical working according to this invention enables to combine advantages which result from the application of a multiphase working medium when working with a larger interelectrode gap with advantages resulting from working with small gaps for finishing by changing the amount of that component of the working medium flowing through this gap, which is capable to electrolytically conduct electric current either by changing solely this component or by a simultaneous change of flow of the whole working medium, measured by flowmeters 16 and 18. Simultaneously the magnitude of the interelectrode gap 31 is changed, whereby a minimum interelectrode gap 31 should be achieved prior to finishing the working.

The adjustment of the flow of gas 17 (see FIG. 1) is achieved by the throttling valve 20 and the adjustment of the flow of the electrolyte 16 by changing the position of the three-way regulating valve 21, whereby the change may be achieved by the attendant or by programmed intervention of some auxiliary elements or in some other way.

EXAMPLES OF APPLICATION

The penetration of the active part of the working tool 13 is started at a ratio of flow rates of gas and electrolyte 250 to 40 (see FIG. 7). After the distance corresponding to the distance of points $b$ and $c$ in the direction of advance of the tool 13 has been covered, the flow of gas 17 is gradually reduced until working of the surface indicated in FIG. 2 by cross section C—C is started. Then, after the flow of gas 17 has stabilized, the original flow of electrolyte 16 is suddenly reduced so that the final ratio of flow of gas and electrolyte is 85 to 20.

The minimum interelectrode gap 31 which is stabilized shortly after point $d$ of the working tool 13 has reached its final position is about 0.09 mm. The shape of the cavity differs less from the shape of the active part of the working tool 13 than for final interelectrode gaps 31 amounting to 0.18 mm., as however points b, c, d are not always worked simultaneously it is impossible to maintain the interelectrode gap of 0.09 for the whole process.

Another possibility of variation of the flow of the working medium is as follows:

At the start of penetration of the tool 13 into the workpiece 30 the original flow ratio of gas and electrolyte 250 to 40 is maintained (see FIG. 8). After the penetration to a depth corresponding to the distance of points b and c both components of the working medium are gradually reduced with a small change of inclination when passing point d, whereby the working is finished at a ratio 80 to 5.

The minimum value of the interelectrode space 31 when finishing the working process 0.06 mm. The finished shape of the workpiece differs from the shape of the active part of the working tool 13 less than for final values of the interelectrode space 0.18 and 0.09 mm. The value of 0.06 of the interelectrode space can be maintained only for a relatively short time as otherwise the active part of the working tool could be damaged by discharges as for the selected electrolyte 16 the dissolution products of the workpiece 30 are solid and form with the electrolyte 16 a colloidal suspension which is removed from the interelectrode space 31 by rinsing.

We claim:

1. In the method of electrochemically working a conductive workpiece by means of a shaped electrode, applying a current between said workpiece and said electrode, spacing said electrode relative to said workpiece to provide an initial gap therebetween of a predetermined width, and rinsing said gap with a multi-phase electrolyte solution, having a predefined ratio of an electrolytically conductive component capable of anodically dissolving the material of said workpiece and a non-conductive component, the improvement comprising the steps of advancing, during a first stage of working, the electrode with respect to said workpiece at rate substantially equal to the rate at which said electrolyte solution dissolves said workpiece to maintain said gap at said predetermined width until said workpiece is substantially worked, thereafter in a second stage of working advancing said electrode at a greater rate with respect to said workpiece to reduce the gap therebetween to a width less than said predetermined width, and simultaneously reducing the ratio in said electrolyte solution of said conductive component to said non-conductive component, until said workpiece is completely finished.

2. In the method according to claim 1, wherein the initial gap has a width less than 0.05 mm.

3. In the method according to claim 1, including the steps of maintaining the pressure and temperature of said electrolyte constant during working.

4. In the method according to claim 1, wherein said ratio of conductive to non-conductive components is gradually reduced continuously in said second stage.

5. In the method according to claim 1, wherein said ratio of conductive to non-conductive component is reduced in intermittent steps during said second stage.

References Cited

UNITED STATES PATENTS

| | | | |
|---|---|---|---|
| 3,650,922 | 3/1972 | Augustin et al. | 204—143 M |
| 3,252,881 | 5/1966 | Inoue | 204—143 M |
| 3,284,327 | 11/1966 | Maeda et al. | 204—143 M |
| 3,461,056 | 8/1969 | Maeda et al. | 204—143 M |
| 3,378,473 | 4/1968 | Inoue | 204—143 M |

FOREIGN PATENTS

| | | | |
|---|---|---|---|
| 12,848 | 7/1966 | Japan | 204—143 M |

OTHER REFERENCES

De Barr et al., Electrochemical Machining, June 1968, Amer. Elsevier Pub., New York, pp. 75, 76, 79, 81.

JOHN H. MACK, Primary Examiner

S. S. KANTER, Assistant Examiner

U.S. Cl. X.R.

204—129.7, 224